Patented Mar. 25, 1952

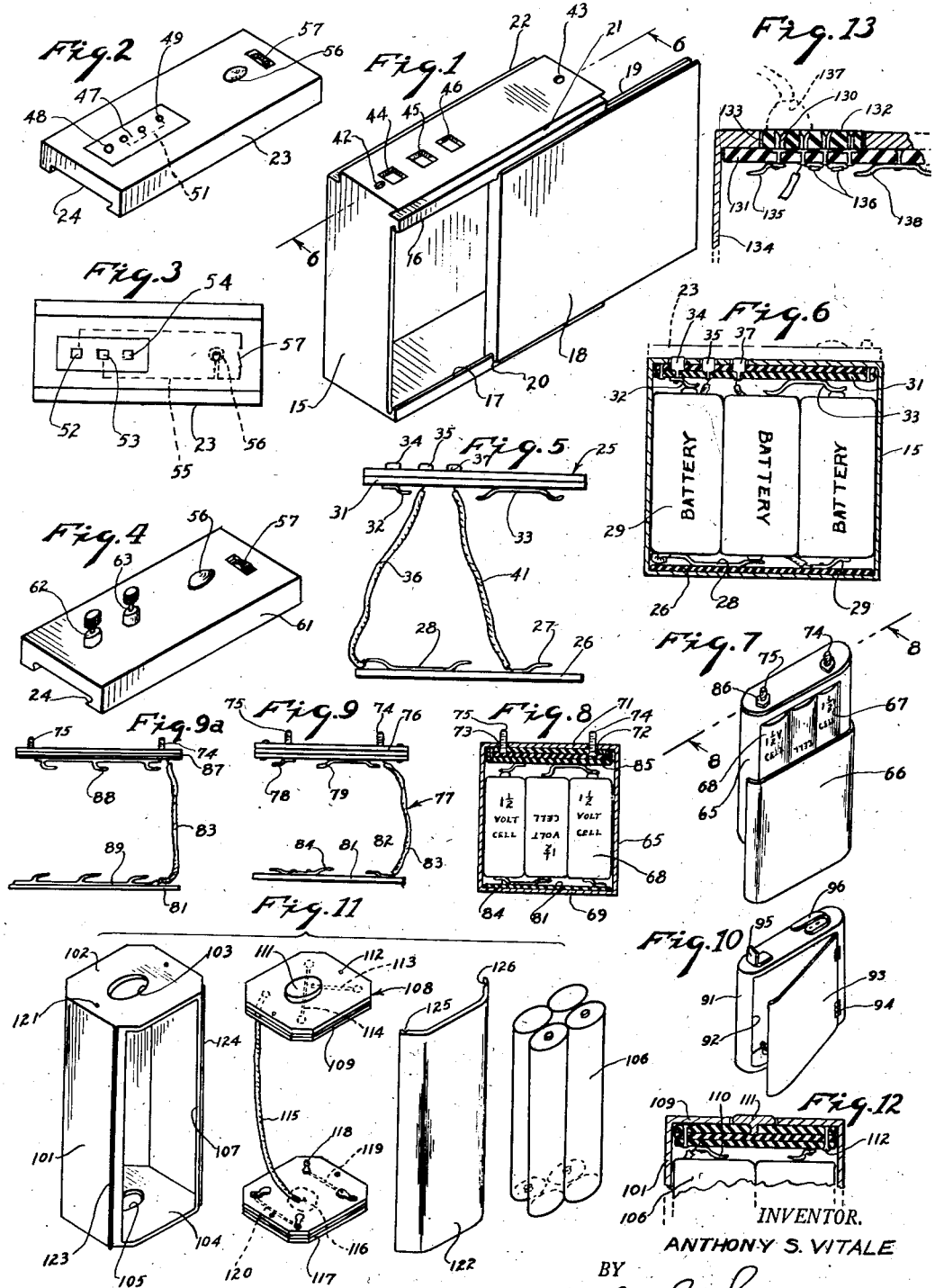

2,590,804

UNITED STATES PATENT OFFICE 2,590,804

BATTERY CASING

Anthony S. Vitale, Brooklyn, N. Y.

Application December 22, 1949, Serial No. 134,370

2 Claims. (Cl. 136—166)

This invention relates to a battery casing in which an assembly of battery dry cells can be made.

It is an object of the present invention to provide a battery casing having an opening adapted to be closed by a slide or door in order to contain a plurality of battery cells within the casing and so as to provide, from the several cells, a single battery unit having voltages depending upon the size of the casing and wherein on the casing there is provided the necessary terminals for effecting the connection of the battery assembly in an electronic instrument such as a radio, hearing aid, portable television sets, and other instruments where the voltage obtainable from a plurality of small dry cells of the flashlight type is desired.

It is another object of the present invention to provide a battery casing adapted to receive a plurality of dry cells to which an adapter can be ready connected to provide the desired terminal connections for the case corresponding to the wire ends of the electronic instrument being supplied with the battery assembly.

It is another object of the present invention to provide a battery casing which is pre-wired to automatically connect with the various battery cells as the same are inserted in the casing and wherein with slight pressure upon the dry cells they are forced between the spring terminals lying within the battery casing and without the need of any wiring having to be effected upon the battery cells themselves.

Other objects of the present invention are to provide a battery package casing having battery output terminals which is of simple construction, inexpensive to manufacture, convenient to use, internally wired, compact and consumes little space and efficient in operation.

For other objects and for a better understanding of the invention, reference may be had to the following detailed description taken in connection with the accompanying drawing, in which Fig. 1 is a perspective view of one form of a battery casing having a slidable door in one side thereof and wherein the casing is provided with grooves for receiving different type terminal adapters.

Fig. 2 is a perspective view of one type of terminal adapter having a light bulb and switch as well as the terminal openings.

Fig. 3 is a bottom plan view of the adapter shown in Fig. 2.

Fig. 4 is a perspective view of a different type of adapter which is provided with binding post terminals instead of the terminal openings.

Fig. 5 is a skeletonized elevational view of the internal terminal parts of the battery casing shown in Fig. 1.

Fig. 6 is a longitudinal sectional view of the battery casing shown in Fig. 1, and of the wiring assembly shown in Fig. 5, the view being taken generally on line 6—6 of Fig. 1.

Fig. 7 is a perspective view of another form of the invention and of a battery casing having a rounded side portion receiving a slide cover and binding posts projecting from the top of the casing.

Fig. 8 is a longitudinal sectional view taken generally on line 8—8 of Fig. 7.

Fig. 9 is a skeletonized side elevational view of the wiring and contact assembly of the battery case shown in Fig. 7, the wiring being effected for series connection of the batteries.

Fig. 9a is a skeletonized elevational view of the wiring and contact assembly adapted for use in the casing shown in Fig. 7, but with the batteries when placed in the casing being hooked up for parallel connections with one another.

Fig. 10 is a perspective view of a still further form of a battery case wherein a door is provided on the side thereof through which access can be had to load the case with battery cells and wherein different contact terminals are provided on the top of the casing.

Fig. 11 is a collective and perspective view of a still further type of battery casing and adapted to receive four pencil-type battery cells and to provide contact terminals on the opposite ends of the casing.

Fig. 12 is a fragmentary and sectional view of a battery case assembly of the type made possible by the parts shown in Fig. 11.

Fig. 13 is a fragmentary sectional view of a still further form of the invention wherein the terminal elements are carried by the insulating plates which may be projected through an opening in the case proper, the terminals being arranged to receive different size plugs and wired similarly to the wiring of the adapter shown in Figs. 2 and 3.

Referring now particularly to Figs. 1 to 6, 15 represents a battery casing formed preferably of molded plastic material although it will be understood that it might likewise be made of tin, fiber, sheet steel, or other similar material. One side of the casing has an opening with guide ways 16 and 17 at the top and bottom respectively over which a slide plate 18 may be slid to provide access to the interior of the casing 15 or to close off the opening thereof. The slide plate 18 has upper and lower grooves 19 and 20 for receiving the respective guide portions 16 and 17. The upper part of the casing 15 is provided with dovetail grooves 21 and 22 to accommodate an adapter 23 having a cooperating dovetail groove 24.

Adapted to be secured within the casing 15 is a terminal and wiring assembly, indicated generally at 25 in Fig. 5. This wiring assembly comprises a bottom insulating strip or plate 26 having a single terminal 27 and a double spring terminal 28 serving to bridge two of the batteries 29 which may be disposed in the casing 15. These batteries are of the flashlight type and contain one and one-half volts. The casing can be of any size to receive any number of these batteries. In the present instance, the casing is of such size as to receive three such batteries 29. A double insulating plate is provided for the top of the casing. This double plate is indicated at 31 and has a single spring terminal 32 and a double spring terminal 33 bridging the two batteries. The spring terminal 32 is connected to a button contact 34. A second button contact 35 is connected by a wire 36 with double spring terminal 28 on the bottom plate 26. This places one battery cell or one and one-half volts between the contact buttons 34 and 35. A third button 37 is connected by a wire 41 with spring terminal 27 on the bottom insulating plate 26. A voltage of four and one-half volts is accordingly placed between the contact buttons 34 and 37.

When the double plate 31 is placed in the casing 15 and secured to the top thereof by rivets 42 and 43, Fig. 1, the contact buttons 34 and 35 and 37 will respectively project through openings 44, 45 and 46 in the top of the casing 15.

The adapter 23 has a terminal block 47 embedded therein in which is a large terminal 48 and a series of terminals 49 connected together by a common wire 51. The bottom of the terminal block has three contacts 52, 53 and 54, Fig. 3, which respectively engage with the contact buttons 34, 35 and 37 when the adapter 23 is slid onto the top of the casing 15. Connected across the contacts 52 and 53 of the adapter 23 is a light circuit 55 including a lamp 56 and a switch 57.

In Fig. 4 there is shown another form of adapter, as indicated at 61, which is adapted to fit over the top of the casing 15 in the same manner as the adapter 23 is fitted thereover. The bottom of this adapter 61 has a similar contact arrangement, such as shown in Fig. 3, to the adapter 23, but has a different terminal arrangement which includes binding posts 62 and 63. The adapter has also the electric lamp 56 and switch 57. Other forms of adapters can be used. With the adapters 23 or 61 in place, the battery case can serve as a flashlight in addition to providing terminals for external wires or plugs of instruments demanding the battery current. The casing 15 can be of any length and can be made to take any number of batteries. With six batteries disposed therein, a voltage of nine volts can be had. With the three batteries therein, as shown, a voltage of four and one-half volts is obtained.

Referring now particularly to Figs. 7, 8, 9 and 9a, there is shown a different form of battery case, wherein there is provided a main casing part 65 having rounded end formations adapted to receive and retain a slide casing part 66. In the main casing part 65 is an opening 67 through which batteries 68 are inserted. The slide part 66 serves as a cover and will close the opening 67. The slide part 66 is slid from the lower end of the casing part 65 and upwardly over the opening 67 to provide a complete closure for the batteries 68. The lower and upper ends of the casing part 65 are closed to provide a bottom 69 and a top portion 71. The top portion has openings 72 and 73 spaced from each other through which terminals 74 and 75 project. These terminal posts are carried by coupled insulating plates 76 forming a part of a terminal and wiring assembly, indicated generally in Fig. 9 by the numeral 77. These insulating plates 76 have a spring terminal 78 connected with the terminal post 75 and a double spring terminal 79 which connects together two of the batteries 68. The assembly 77 further includes a bottom plate 81 of insulating material which rests on the bottom 69 of the casing part 65 and which has a spring terminal 82 which is connected by a wire 83 with terminal post 74 of the upper insulating plates 76 and which further has a double spring terminal 84 which connects together the lower ends of two batteries 68. With the wires and spring terminals so arranged in this manner, the batteries 68 are placed in series with one another. The insulating plates 76 are held together by rivets 85 and these plates are held in the top of the casing part 65 by nuts 86 connected respectively to the terminal posts 74 and 75.

The terminal and wire assembly can be altered, as shown in Fig. 9, to provide an arrangement which will place the several batteries in parallel relationship. In this instance, as shown in Fig. 9a, top insulating plates 88 contain terminal posts 74 and 75, but the terminal post 75 is connected to a triple spring contact element 88. The wire 83 will connect with a similar triple contact 89 on the bottom insulating plate 81. A similar wiring could be had of the battery case arrangement and the wiring and contact assembly 25 of the previously described form of the invention to arrange the batteries thereof in parallel relationship.

In Fig. 10, there is shown a casing part 91 similar to the casing part 65 of Fig. 7, but which has a larger opening 92 in the side thereof. A door 93 is hinged, as indicated at 94, to the side of the opening 92 and can be closed upon batteries which may be disposed within the part 91. Spring terminal elements 95 and 96 are provided upon the top portion of the casing part 91. A similar spring terminal and wire assembly, as shown in Figs. 9 and 9a, may be disposed in this casing part 91. The batteries are disposed therein in the manner as shown in Fig. 8 in the case of the series assembly 77 being used and with the intermediate battery cell inverted. Where the arrangement shown in Fig. 9a is used, the battery cell will lie extended in the same direction. The battery cases 65 and 91 can be easily fitted into the various instruments adapted to receive them in the same manner that an ordinary multi-cell battery is fitted into them.

Referring now particularly to Figs. 11 and 12, there is shown a still further form of the invention. In this form of the invention there is provided a casing 101 having a top portion 102 with a large central opening 103 therein and a bottom portion 104 with an opening 105 therein. This casing part 101 is adapted to receive four pencil-type battery elements 106, two of which are arranged in an inverted manner. The casing part 101 has a side opening 107 through which the battery elements 106 are inserted. The casing part 101 has a terminal and wire assembly, indicated generally at 108. The terminal and wire assembly 108 comprises a set of insulating plates 109 which have a plurality of spring terminals 110 depending from the bottom one of the plates and a single contact button 111 which projects through the opening 103 of the top portion 102 to provide an end terminal for the unit. The plates 109 are connected together by rivets 112 and have within them wires 113 and 114.

A wire 115 extends downwardly from the plates 109 and connects with a center button 116 which projects through the opening 105 in the bottom portion 104. The button terminal 116 is carried upon plates 117 which have spring terminal elements 118 that are connected by wires 119 and 120. The plates 109 and 117 will be retained by the top and bottom portions of the casing 101 by securing elements adapted to extend through openings or holes 121 in the portions. With the battery elements 106 in place between the insulating plates and the spring terminals, they may be retained in place within the opening 117 by a slide or snap cover 122 fitted over the opening 107 with the edges thereof disposed over vertically extending beads 123 and 124 respectively. The cover has grooves 125 and 126 for receiving the beads.

In Fig. 13, there is shown a still further form of the invention wherein female type terminals 130 are connected to an insulating plate 131 and lie within a block 132 carried by the insulating plate and which extends through a large opening 133 in the top of the casing 134. The terminal at the left is a large terminal and has spring terminal 135 which engages with one of the batteries. The other three terminals are connected together, as indicated by wires 136. A plug 137 can be fitted into any of the terminals 130. The plug 137 of a different width will extend between the terminal 130 at the left and a third or fourth terminal therefrom. Different instruments have different width plugs and prong spacings. Hence the reason for the three terminals at the right connected together. The insulating plate 31 may also have double spring terminals 138. It will be apparent that the arrangement shown in Fig. 13 makes the adapter 23 for the casing 15 of Fig. 1 unnecessary for the attachment of a plug to the battery arrangement.

All of these casings are preferably made of plastic material molded to the desired shape, but it will be understood that other materials can be used for the formation of the same. The batteries, when assembled in the casing parts, provide a compact battery unit which may be fitted into the various instruments or which can be carried as a separate container. The battery unit is particularly adapted for use with radio sets, hearing aids, measuring instruments and other portable devices.

While various changes may be made in the detail construction, it shall be understood that such changes shall be within the spirit and scope of the present invention as defined by the appended claims.

I claim:

1. A battery unit comprising an integral casing having top and bottom portions and a side opening, a closure element operable on the casing to close the side opening thereof, said side opening being adapted to receive battery elements for the purpose of placing the same within the casing, said top portion having a series of small openings therein, a combined contact and wiring assembly comprising top and bottom insulating plates, certain of said plates having terminal projections extending through the openings in the top portion, said insulating plates having spring contact elements thereon, adapted to receive and retain batteries disposed within the casing and to engage the terminals of the batteries and wiring connected between the contact elements and the terminal projections to place the batteries automatically in circuit relationship with each other and with the terminal projections upon the batteries being disposed in the casing and an adaptor removably attached to the top of the casing and having contact terminals engageable with the terminal projections extending through the openings in the top portion of the casing.

2. A battery unit comprising an integral casing having top and bottom portions and a side opening, a closure element operable on the casing to close the side opening thereof, said side opening being adapted to receive battery elements for the purpose of placing the same within the casing, said top portion having a series of small openings therein, a combined contact and wiring assembly comprising a top and bottom insulating plates, certain of said plates having terminal projections extending through the openings in the top portion, said insulating plates having spring contact elements thereon, adapted to receive and retain batteries disposed within the casing and to engage the terminals of the batteries and wiring connected between the contact elements and the terminal projections to place the batteries automatically in circuit relationship with each other and with the terminal projections upon the batteries being disposed in the casing and an adaptor removably attached to the top of the casing and having contact terminals engageable with the terminal projections extending through the openings in the top portions of the casing, said adaptor having lamp circuit means connected to the contact terminals thereof and including a lamp and a switch for controlling the operation of the lamp circuit.

ANTHONY S. VITALE.

REFERENCES CITED

The following references are of record in the file of this patent:

UNITED STATES PATENTS

| Number | Name | Date |
| --- | --- | --- |
| 1,316,568 | Fertman et al. | Sept. 23, 1919 |
| 1,583,517 | Barany | May 4, 1926 |
| 1,827,625 | Sterk | Oct. 13, 1931 |
| 2,329,856 | Salathe et al. | Sept. 21, 1943 |

FOREIGN PATENTS

| Number | Country | Date |
| --- | --- | --- |
| 359,441 | Great Britain | Oct. 21, 1931 |
| 377,925 | Germany | June 29, 1923 |
| 397,068 | Great Britain | Aug. 17, 1933 |
| 866,572 | France | Aug. 20, 1941 |

OTHER REFERENCES

Air Trails Pictorial, October 1944, page 76.
Du Pont Plastic Bulletin, vol. 10, No. 39, October 1948, page 155.